May 16, 1950 E. G. DORGELO ET AL 2,508,233
METHOD OF PRODUCING A GAS-TIGHT JOINT BETWEEN A GLASS
OBJECT AND A METAL OBJECT WHICH HAVE MUTUALLY
DIFFERENT COEFFICIENTS OF EXPANSION
Filed May 2, 1946
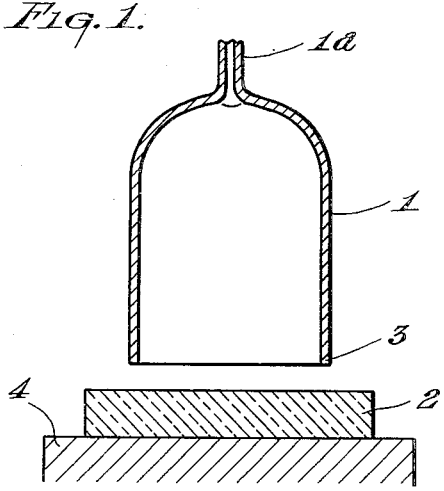
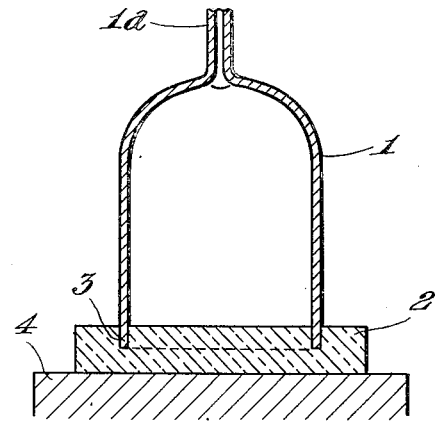
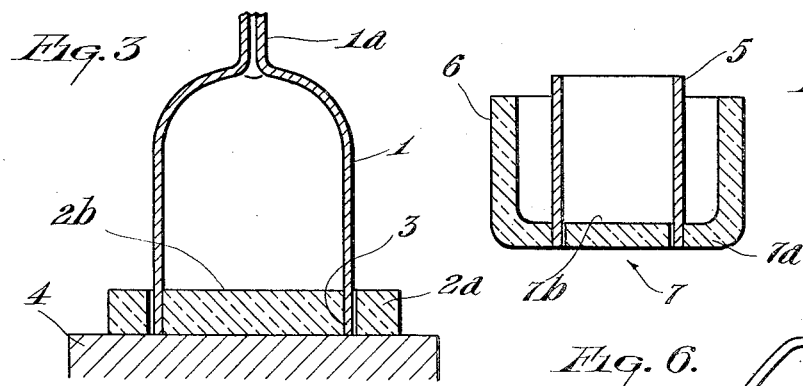
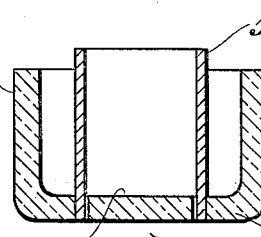
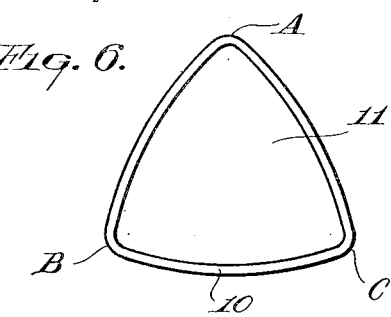
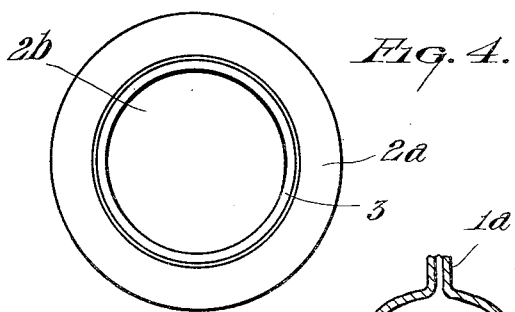
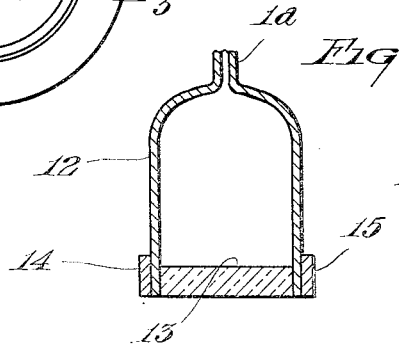
EDUARD GERARDUS DORGELO
HENDRICUS JOHANNES LEMMENS
INVENTORS.
BY 
ATTORNEY.

Patented May 16, 1950

2,508,233

UNITED STATES PATENT OFFICE 2,508,233

METHOD OF PRODUCING A GAS-TIGHT JOINT BETWEEN A GLASS OBJECT AND A METAL OBJECT WHICH HAVE MUTUALLY DIFFERENT COEFFICIENTS OF EXPANSION

Eduard Gerardus Dorgelo and Hendricus Johannes Lemmens, Eindhoven, Netherlands, assignors, by mesne assignments, to Hartford National Bank and Trust Company, Hartford, Conn., as trustee Application May 2, 1946, Serial No. 666,570
In the Netherlands August 21, 1941

Section 1, Public Law 690, August 8, 1946
Patent expires August 21, 1961

3 Claims. (Cl. 49—81)

In those cases wherein a glass object such as a disc has to be sealed into a tubular metal object, we proceed as a rule in such manner that the starting-point is formed by a glass disc the dimensions of the outer circumference of which substantially correspond to those of the inner circumference of the metal object at the place of the joint to be produced and that then, whilst the metal object is in heated condition, the glass object is pushed into the tubular of the metal object. During the subsequent cooling down the metal shrinks, due to the disparity in the coefficients of expansion, to a higher extent than the glass, which leads to the establishment of the desired joint. It is necessary to dimension the glass object at the place of the joint to be produced very exactly relatively to the dimensions of the metal object.

Such is not the case with the method according to the invention. By applying the invention it is possible to produce in a very simple manner a gas-tight joint between a glass object and a metal object, by which method it is possible to seal the glass object into as well as around this tubular portion. The method according to the invention is characterized in that a tubular portion of the metal object, which is raised to a temperature which exceeds the softening temperature of the material of the glass object, is placed on a plate-shaped and likewise preheated portion of the glass object in such manner that the whole circumference of the metal portion is located within the circumference of this glass portion and is then pushed through the latter portion. Owing to the fact that the tubular metal object is pushed through the glass, the metal adheres to the glass directly after the insertion in so far as no steps are taken to prevent adherence. Owing to this direct adherence of the metal to the glass, it is possible to produce, according to the invention, not only joints with which the material located on the outside has the largest coefficient of expansion as is the case with the known sealed joints mentioned in the preamble but also joints with which the two materials have equal or substantially equal coefficients of expansion. It is even possible to produce sealed joints with which the material located on the outside has a coefficient of expansion which is slightly smaller than that of the material located on the inside. In general the purpose in view is to admit substantially compressive stresses in the glass present in the sealing zone.

The invention will be explained more fully with reference to the accompanying drawing.

Figs. 1, 2, 3 and 4 represent three successive stages in the production of a glass-tight joint according to the invention between a metal object, which is formed here as a cylindrical bulb 1 having a wall thickness of 0.75 mm., and a glass object 2 the whole of which is shown here in the form of a plate. The bulb 1, the lower portion of which has a tubular shape, consists here of iron having a linear coefficient of expansion of $129 \times 10^{-7}$ whereas the glass object 2 consists of lead glass having a coefficient of expansion of $90 \times 10^{-7}$. The glass plate 2 lies on a table 4.

First the bulb 1 and the plate 2 are arranged in the relative position shown in Fig. 1 wherein more particularly the lower edge 3 of the bulb 1 is heated, for example by high-frequency action, to a temperature of about 700° C. With the aid of gas burners the plate 2 is raised to a temperature of about 400° C. The bulb 1 is then moved downwards until the edge 3 reaches the upper surface of the plate 2, care being taken to ensure that the whole of the circumference of the metal portion, i. e. the bulb 1, is located within the circumference of the glass portion, i. e. the plate 2. This is distinctly visible in Fig. 4 which represents a bottom view of Fig. 3. Subsequently, the lower edge 3 of the bulb 1 is pushed through the glass plate 2 (Fig. 2) and moved downwards until the lower edge 3 of the bulb 1 comes to bear on the table 4 which carries the plate 2, the situation of the bulb and of the plate as shown in Fig. 4 being now obtained. The lower edge of the bulb 1 has cut, so to speak, a circular disc 2b out of the plate 2 and the inside of the edge 3 adheres to the upright wall of the portion 2b of the plate 2. When now the metal and the glass cool down, the metal shrinks to a higher extent than the glass with the result that the glass disc 2b is rigidly fixed in the lower edge 3 of the bulb 1, a gas-tight joint between the plate 2b and the bulb 1 being thus obtained. That portion of the plate which is located outside the lower edge 3 of the bulb, which portion is denoted in Figs. 3 and 4 by 2a, shrinks during the cooling down to a less extent than the bulb 1 so that between the outer wall of the bulb 1 and the portion 2a of the glass plate 2 there is produced a space which is shown exaggerated in Figs. 3 and 4 and which permits us, when all the parts have sufficiently cooled down, to lift the bulb 1 together with the sealed-in disc 2 out of the remainder 2a of the plate 2. If also the portion 2a of the plate 2 might adhere to the edge 3 of the bulb, this portion can easily be removed from the edge 3 by tapping it off. In producing this sealed joint use is made of the phenomenon that glass can sustain very high compressive stresses, for the disc 2b is exposed to pressure. In any manner known in itself this disc may contain a plurality of sealed-in metal wires, an exhaust tube and the like, which may act as current supply members in the case wherein the bulb 1 and the disc 2b of Fig. 3 act as an envelope for a discharge tube. For this purpose the bulb 1 may be equipped, in addition, with one or more current supply members and/or an exhaust tube. In order to allow the air present between the bulb 1 and the disc 2b to escape during the sealing operation, this disc or the bulb is provided with an aperture, in the present instance the exhaust tube 1a on the bulb.

According to the invention, it is advantageous to provide those portions of the metal object which must adhere to the glass, i. e. in the present instance the inside of the lower portion 3 of the bulb 1, beforehand with a layer of enamel, which facilitates the adherence of the metal to the glass. Furthermore, it is advantageous, in accordance with the invention, to coat those portions of the metal object which enter into contact with the plastic glass and which must not adhere thereto, in the present instance the outside of the lower edge 3 of the bulb 1, with a thin layer of a substance which prevents the metal from adhering to the glass such, for example, as graphite.

According to the invention, the glass object may exhibit, in particular at least at the place of the sealed joint, a vacuum-tight structure which consists, to at least 5%, of finely divided cavities and which has a specific weight which is by at least 5% lower than that of the glass present in homogeneous and substantially air- or gas-free condition in the object at the place of the joint. It is possible, for example, to imagine the case wherein the glass plate 2 shown in Figs. 1, 2, 3 and 4 consists of so-called powdered glass. This plate may form part, for example, of an object consisting of clear glass. Applicant has found that in particular this powdered glass is extremely suitable for being utilized in a sealed joint produced according to the invention.

Whereas in the example illustrated in Figs. 1, 2, 3 and 4 the metal has a coefficient of expansion which exceeds that of the glass, it is also possible, according to the invention, to produce a sealed joint with which the coefficient of expansion of the glass is equal to that of the metal. One example thereof is illustrated in Fig. 5.

In the example of the sealed joint according to the invention which is shown in Fig. 5, the cylindrical tubular portion 5 consists of chrome-iron having a coefficient of expansion of $95 \times 10^{-7}$. The glass object consists of a cup-shaped body 6 having on its lower side a plate-shaped bottom 7. This glass body consists of lead glass whose coefficient of expansion likewise amounts to $95 \times 10^{-7}$. In a manner analogous to that described with reference to Figs. 1, 2, 3 and 4, the metal object 5 is heated to a temperature of about 600° C. and more particularly the bottom 300° C. Then the metal tube is pushed through the bottom 7 of the cup 6. During the subsequent cooling the bottom 7 and the tube 5 shrink in the radial direction to a substantially equal extent. Also in this way a gas-tight joint is obtained.

It is evident that in this mode of realisation of the invention and also in that according to Figs. 6 and 7 the steps described with regard to Figs. 3 and 4 may be utilized to facilitate the adherence of the metal to the glass or to prevent the adherence of these materials at points where such is not desired.

Fig. 6 represents the bottom view of a sealed joint according to the invention wherein the tubular portion 10 of the metal object has a triangular instead of a circular cross-section. In order to ensure a satisfactory adherence of the glass 11 (here powdered glass) having a coefficient of expansion of $90 \times 10^{-7}$ to the metal 10, here iron having a coefficient of expansion of $129 \times 10^{-7}$, and to bring about a vacuum-tight joint throughout the whole circumference, the parts in a cross-section of the tube which interconnect the angular points A, B and C, are not straight but, according to an advantageous embodiment of the invention, slightly curved.

Finally, Fig. 7 represents an embodiment of the invention wherein a sealed joint between a tube 12 of copper having a coefficient of expansion of $190 \times 10^{-7}$ and a plate 13 of lead glass having a coefficient of expansion of $90 \times 10^{-7}$ is represented. In order to avoid that due to the compressive stresses produced in the material of the plate 13 during the cooling down, the material of the tube 12, which consists, as has previously been mentioned, of copper and which has therefore a low yield point undergoes a permanent deformation, a ring 15 of a material having a higher breaking down point than copper is laid around the lower edge 14 of the tube 12.

We claim:

1. A method of producing a gas-tight seal between a metal chamber and a glass body, comprising the steps of coating the portion of the metal chamber to be sealed with a thin layer of enamel, heating the end of the metal chamber to a temperature above the softening point of the glass of said body, heating a piece of glass larger than the end of said chamber, then forcing the heated end of said chamber through said heated glass piece whereby a portion thereof conforming to the interior cross section of the chamber is cut therefrom to form said body and the said body is sealed within the chamber.

2. A method of producing a gas-tight seal between a metal chamber and a glass body, comprising the steps of coating a portion of the exterior of the metal chamber with a substance to prevent adhesion of the said glass body to the said exterior portion of said chamber, heating the end of the metal chamber to a temperature above the softening point of the glass of said body, heating a piece of glass larger than the end of said chamber, then forcing the heated end of said chamber through said heated glass piece whereby a portion thereof conforming to the interior cross section of the chamber is cut therefrom to form said body and the said body is sealed within the chamber.

3. A method of producing a gas-tight seal between a metal chamber and a glass body, comprising the steps of coating a portion of the exterior of the metal chamber with graphite to prevent adhesion of the said glass body to the said exterior portion of said chamber, heating the end of the metal chamber to a temperature above the softening point of the glass of said body, heating a piece of glass larger than the end of said chamber, then forcing the heated end of said chamber through said heated glass piece whereby a portion thereof conforming to the interior cross section of the chamber is cut therefrom to form said body and the said body is sealed within the chamber.

EDUARD GERARDUS DORGELO.
HENDRICUS JOHANNES LEMMENS.

REFERENCES CITED

The following references are of record in the file of this patent:

UNITED STATES PATENTS

| Number | Name | Date |
|---|---|---|
| 230,709 | Lomax | Aug. 3, 1880 |
| 673,009 | Poulson | Apr. 30, 1901 |
| 997,489 | Genese | Dec. 22, 1908 |
| 1,695,830 | Thurneyssen | Dec. 18, 1928 |
| 1,838,781 | Moulton et al. | Dec. 29, 1931 |
| 2,010,145 | Eitel | Aug. 6, 1935 |
| 2,048,556 | McArthur | July 21, 1936 |
| 2,053,765 | Dana | Sept. 8, 1936 |

FOREIGN PATENTS

| Number | Country | Date |
|---|---|---|
| 20,948 | Austria | Apr. 30, 1936 |
| 115,092 | Austria | May 14, 1942 |
| 117,132 | Austria | June 6, 1943 |